(12) United States Patent
Fujii et al.

(10) Patent No.: US 12,017,265 B2
(45) Date of Patent: Jun. 25, 2024

(54) METHOD FOR EVALUATING BENDING CRACK, SYSTEM FOR EVALUATING BENDING CRACK, AND METHOD FOR MANUFACTURING PRESS-FORMED COMPONENT

(71) Applicant: JFE STEEL CORPORATION, Tokyo (JP)

(72) Inventors: Kento Fujii, Tokyo (JP); Yuji Yamasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 408 days.

(21) Appl. No.: 17/433,375

(22) PCT Filed: Dec. 19, 2019

(86) PCT No.: PCT/JP2019/049934
§ 371 (c)(1),
(2) Date: Aug. 24, 2021

(87) PCT Pub. No.: WO2020/174841
PCT Pub. Date: Sep. 3, 2020

(65) Prior Publication Data
US 2022/0168791 A1 Jun. 2, 2022

(30) Foreign Application Priority Data
Feb. 26, 2019 (JP) ................. 2019-033076

(51) Int. Cl.
*B21D 24/16* (2006.01)
*G01N 3/20* (2006.01)
*G01N 3/28* (2006.01)

(52) U.S. Cl.
CPC ............... *B21D 24/16* (2013.01); *G01N 3/20* (2013.01); *G01N 3/28* (2013.01);
(Continued)

(58) Field of Classification Search
CPC . B21D 24/16; G01N 3/20; G01N 3/28; G01N 2203/0066; G01N 2203/0218; G01N 2203/0246; G01N 2203/027
See application file for complete search history.

(56) References Cited

U.S. PATENT DOCUMENTS 3,978,706 A * 9/1976 Nakagawa ............... B21D 7/06
72/389.5
8,156,780 B2 * 4/2012 Fellenberg ............ B21D 28/02
83/17
(Continued)

FOREIGN PATENT DOCUMENTS

CN 104075949 A * 10/2014
CN 104568605 A 4/2015
(Continued)

OTHER PUBLICATIONS

Mar. 18, 2022 extended Search Report issued in European Patent Application No. 19916684.4.
(Continued)

*Primary Examiner* — Octavia Davis Hollington
(74) *Attorney, Agent, or Firm* — Oliff PLC (57) ABSTRACT

A technology for evaluating forming allowance for a bending crack at a sheared end face of the press-formed component from shape information of an actual component. The method includes applying press forming including bending deformation to a metal sheet being sheared to manufacture a press-formed component, evaluating forming allowance for a bending crack at a sheared end face being an end face subjected to the shearing. A crack index value for evaluating the bending crack at the sheared end face of the press-formed component is obtained from a bend outer side strain at or near the sheared end face acquired on a basis of a component shape of the press-formed component and a press die bend radius at a portion forming the sheared end
(Continued)

face in a press die used in the press forming, and the forming allowance for the bending crack is evaluated by the obtained crack index value.

20 Claims, 5 Drawing Sheets

(52) U.S. Cl.
CPC .............. *G01N 2203/0066* (2013.01); *G01N 2203/0218* (2013.01); *G01N 2203/0246* (2013.01); *G01N 2203/027* (2013.01)

(56) References Cited

U.S. PATENT DOCUMENTS

| | | | | |
|---|---|---|---|---|
| 9,333,549 | B2 * | 5/2016 | Fujii | ........................ B21D 37/20 |
| 9,874,504 | B2 * | 1/2018 | Yonemura | ................ G06F 30/20 |
| 9,953,115 | B2 * | 4/2018 | Sonobe | .................. B21D 22/02 |
| 11,590,591 | B2 * | 2/2023 | Fujii | ........................ G01N 3/24 |
| 2015/0231682 | A1 | 8/2015 | Fujii et al. | |
| 2015/0294043 | A1 | 10/2015 | Sonobe et al. | |
| 2016/0161382 | A1 | 6/2016 | Yonemura et al. | |
| 2020/0276658 | A1 | 9/2020 | Fujii et al. | |

FOREIGN PATENT DOCUMENTS

| | | | | | |
|---|---|---|---|---|---|
| CN | 105283874 | A | | 1/2016 | |
| CN | 105848801 | A | * | 8/2016 | ........... B21D 22/201 |
| CN | 107708884 | A | * | 2/2018 | ............. B21D 19/08 |
| CN | 107976371 | A | | 5/2018 | |
| JP | 2006-155254 | A | | 6/2006 | |
| JP | 2009172609 | A | * | 8/2009 | |
| JP | 2009-204427 | A | | 9/2009 | |
| JP | 2010-069533 | A | | 4/2010 | |
| JP | 2011-043452 | A | | 3/2011 | |
| JP | 2011-140046 | A | | 7/2011 | |
| JP | 2012-166251 | A | | 9/2012 | |
| JP | 2013-128957 | A | | 7/2013 | |
| JP | 2014-115269 | A | | 6/2014 | |
| JP | WO2017057466 | A1 | * | 8/2018 | |
| JP | 2020040111 | A | * | 3/2020 | |
| JP | 2021001754 | A | * | 1/2021 | |
| JP | 7243803 | B1 | * | 3/2023 | |
| KR | 20170094286 | A | * | 8/2017 | |
| WO | 2013/094183 | A1 | | 6/2013 | |
| WO | 2014/077060 | A1 | | 5/2014 | |
| WO | WO-2015008495 | A1 | * | 1/2015 | ............. B21D 19/08 |
| WO | 2019/017136 | A1 | | 1/2019 | |
| WO | 2019/064922 | A1 | | 4/2019 | |

OTHER PUBLICATIONS

Nov. 2, 2022 Office Action Action Issued in Chinese Patent Application No. 201980092534.2.
Mar. 3, 2020 Search Report issued in International Patent Application No. PCT/JP2019/049934.
Aug. 25, 2021 International Preliminary Report on Patentability issued in International Patent Application No. PCT/JP2019/049934.

* cited by examiner

METHOD FOR EVALUATING BENDING CRACK, SYSTEM FOR EVALUATING BENDING CRACK, AND METHOD FOR MANUFACTURING PRESS-FORMED COMPONENT

TECHNICAL FIELD

The present invention relates to a technology for evaluating a bending crack at a sheared end face when press forming a sheared metal sheet to manufacture a desired press-formed component and a method for manufacturing a press-formed component using the same.

BACKGROUND ART

Currently, automobiles are required to improve fuel efficiency by weight reduction and improve collision safety. Then, in order to achieve both vehicle weight reduction and passenger protection in the event of a collision, high strength steel sheets tend to be used for structural components for automobiles. When such high strength steel sheets are used as metal sheets, one of forming defects that occur during press forming is cracking. In particular, when a high strength steel sheet is used as a metal sheet for press forming, the occurrence of a crack at an end face after shearing (hereinafter also referred to as sheared end face) is an important issue.

Cracks at the sheared end face are roughly classified into cracks due to stretch flange deformation and cracks (bending cracks) due to bending deformation.

Methods for evaluating a stretch flange crack are described, for example, in PTL 1 to 3. PTL 1 describes a prediction method considering a strain gradient in an in-plane direction of a sheet and a prediction method considering a stress gradient in a sheet surface. PTL 2 describes a technology that uses a relationship between strain gradient, strain concentration, and fracture strain in stretch flange deformation. PTL 3 describes a crack prediction method using a relationship between forming limit strain and strain gradients in a sheet in-plane direction and a sheet thickness direction.

On the other hand, no crack evaluation method for a bending crack at a sheared end face has been developed. Particularly, there is a demand for the development of a technology for evaluating a bending crack at a sheared end face before press forming when a component shape of a press-formed component after press forming is determined.

CITATION LIST

Patent Literature

PTL 1: JP 2010-069533 A
PTL 2: JP 2011-140046 A
PTL 3: JP 2014-115269 A

SUMMARY OF INVENTION

Technical Problem

The present invention has been made paying attention to the points as above. It is an object of the present invention to provide a technology for evaluating a bending crack at a sheared end face in a press-formed component, such as predicting the occurrence of a bending crack at the sheared end face when press formed into a desired press-formed component from shape information of an actual component or the like, and a method for manufacturing a press-formed component using the technology.

Solution to Problem

The inventors of the present application evaluated by experimentally determining a relationship between a bend outer side strain at or near a sheared end face where a bending crack occurs and a stress gradient near the sheared end face obtainable from forming conditions through various forming tests. Then, the inventors found that forming allowance for a bending crack at the sheared end face can be evaluated by comparing the relationship between the bend outer side strain at or near the sheared end face at the time of press forming and the stress gradient determined by the forming conditions.

In other words, aspects of the present invention relate to technologies that enable a method for evaluating bendability required for a metal sheet from shape information and a method for evaluating a concern about a crack occurring in a metal sheet using the method.

Then, in order to solve the problem, an aspect of the present invention is a method for, when applying press forming including bending deformation to a metal sheet subjected to shearing to manufacture a desired press-formed component, evaluating a bending crack at a sheared end face being an end face subjected to the shearing, the method including obtaining a crack index value for evaluating the bending crack at the sheared end face of the press-formed component from a bend outer side strain at or near the sheared end face acquired on a basis of a component shape of the press-formed component and a press die bend radius at a portion forming the sheared end face in a press die used in the press forming.

Additionally, another aspect of the present invention is a bending crack evaluation system for, when applying press forming including bending deformation to a metal sheet subjected to shearing to manufacture a desired press-formed component, evaluating a bending crack at a sheared end face being an end face subjected to the shearing, the bending crack evaluation system including a crack index value calculation unit configured to input a bend outer side strain at or near the sheared end face acquired on a basis of a component shape of the press-formed component and a press die bend radius at a portion forming the sheared end face in a press die used in the press forming and obtain a crack index value for evaluating the bending crack at the sheared end face of the press-formed component from the input bend outer side strain and bend radius.

In addition, another aspect of the present invention is a method for manufacturing a press-formed component, configured to apply press forming including bending deformation to a metal sheet subjected to shearing to manufacture the press-formed component, the method including evaluating a metal sheet to be press-formed by the bending crack evaluation method according to the aspect of the present invention to select a metal sheet estimated that no bending cracks occur at the sheared end face when the press forming is applied and using the selected metal sheet to manufacture the press-formed component.

Advantageous Effects of Invention

According to the aspect of the present invention, for example, a bending crack at a sheared end face of a metal sheet required for press forming can be evaluated for each candidate metal sheet. By doing this, according to the aspect of the present invention, for example, it can be evaluated with high accuracy whether the selection of metal sheets used when press forming various kinds of components, such as panel components and structural/skeletal components for automobiles, is appropriate. As a result, according to the aspect of the present invention, press forming can be performed stably, and a significant contribution can be made to reducing the defect rate of press-formed components.

DESCRIPTION OF EMBODIMENTS

Next, a present embodiment will be described with reference to the drawings.

The present embodiment relates to a method for evaluating a bending crack at a sheared end face when applying press forming including bending deformation to a sheared metal sheet to manufacture a desired press-formed component (hereinafter also referred to as actual component). In the evaluation of a bending crack, for example, forming allowance for a bending crack is evaluated.

Figure 1:
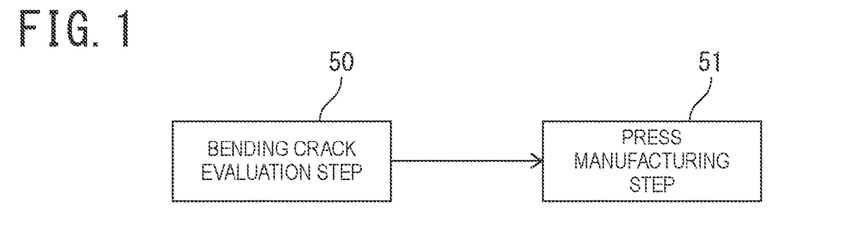
FIG. 1 is a diagram illustrating an example of steps of a method for manufacturing a press-formed component according to an embodiment based on the present invention.

Specifically, as illustrated in FIG. 1, a method for manufacturing a press-formed component according to the present embodiment includes a press manufacturing step 51 of applying press forming including bending deformation to a sheared metal sheet by a known press device to manufacture a desired press-formed component. The present embodiment includes a bending crack evaluation step 50 of evaluating a bending crack of the metal sheet as a step before actually press forming into a press-formed component in the press manufacturing step 51.

Figure 2:
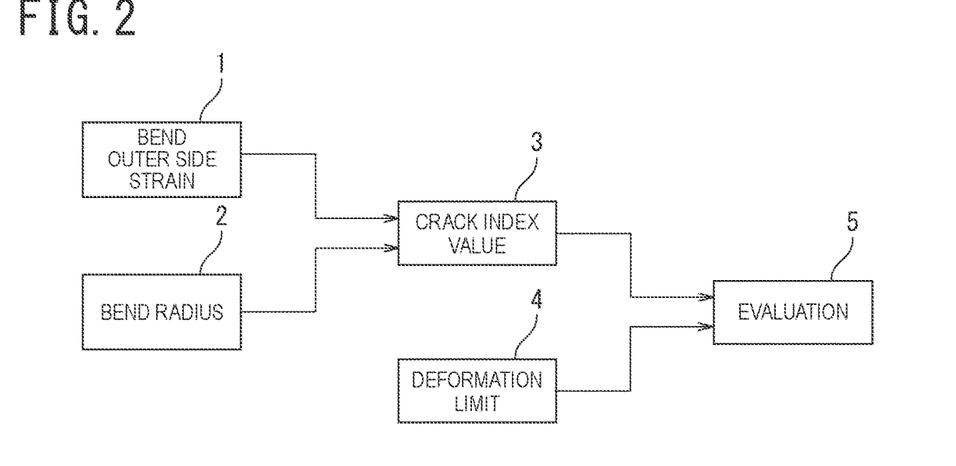
FIG. 2 is a diagram illustrating an evaluation method according to an embodiment based on the present invention.

For example, as illustrated in FIG. 2, the bending crack evaluation step 50 of the present embodiment includes steps 1 to 5. Step 1 acquires a bend outer side strain at or near an evaluation position from shape information. Step 2 acquires a bend radius at or near the evaluation position from the shape information. Step 3 obtains a crack index value at the evaluation position from the acquired bend outer side strain and bend radius. Step 4 obtains a bending deformation limit for each target metal sheet as evaluation reference information. Step 5 compares the crack index value obtained in step 3 with the bending deformation limit obtained in advance in step 4 to evaluate a bending crack at a sheared end face to be evaluated.

Figure 3:
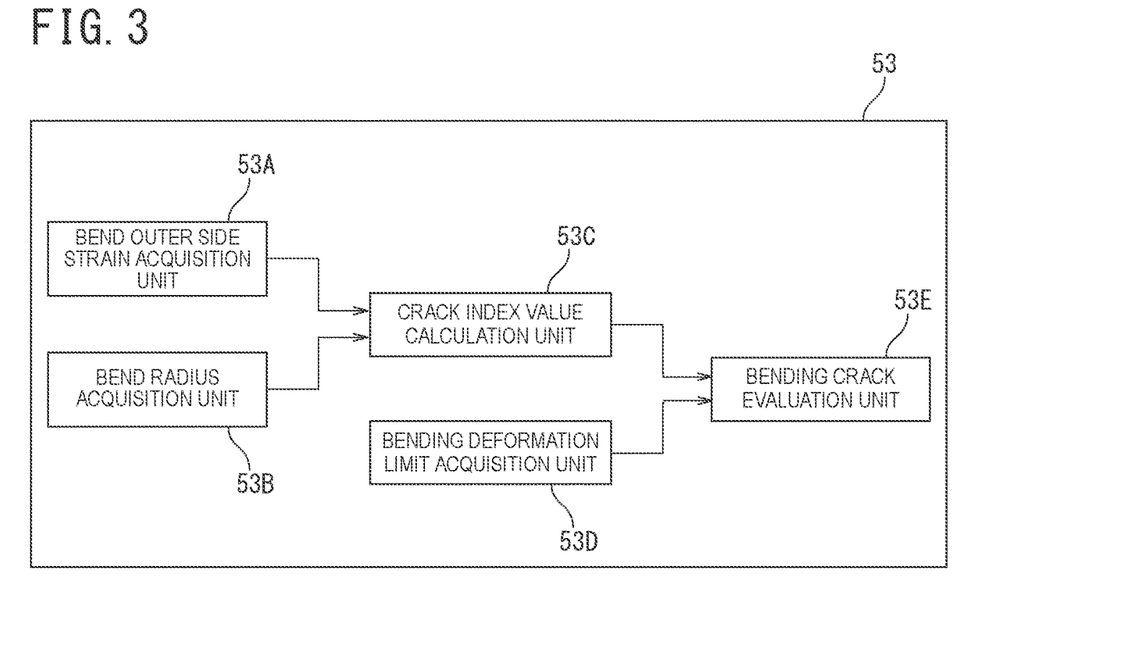
FIG. 3 is a diagram illustrating a bending crack evaluation system according to an embodiment based on the present invention.

The above bending crack evaluation step 50 is executed by, for example, a bending crack evaluation system 53. For example, as illustrated in FIG. 3, the bending crack evaluation system 53 includes a bend outer side strain acquisition unit 53A, a bend radius acquisition unit 53B, a crack index value calculation unit 53C, a bending deformation limit acquisition unit 53D, and a bending crack evaluation unit 53E.

The bend outer side strain acquisition unit 53A executes processing for acquiring the bend outer side strain at or near the evaluation position from acquired shape information. The bend radius acquisition unit 53B executes processing for acquiring the bend radius at or near the evaluation position from the acquired shape information. The crack index value calculation unit 53C executes processing for obtaining a crack index value at the evaluation position from the bend outer side strain acquired by the bend outer side strain acquisition unit 53A and the bend radius acquired by the bend radius acquisition unit 53B. The bending deformation limit acquisition unit 53D executes processing for obtaining a bending deformation limit for each target metal sheet as the evaluation reference information. The bending crack evaluation unit 53E executes processing for comparing the crack index value obtained by the crack index value calculation unit 53C with the bending deformation limit obtained in advance by the bending deformation limit acquisition unit 53D to evaluate a bending crack at the sheared end face to be evaluated. Among the bend outer side strain acquisition unit 53A, the bend radius acquisition unit 53B, the crack index value calculation unit 53C, the bending deformation limit acquisition unit 53D, and the bending crack evaluation unit 53E, at least the crack index value calculation unit 53C is provided as a program to be executed by a computer.

One of characteristics of the present embodiment is that the bend outer side strain and the bend radius described above are obtained from shape information of an actual component and a press die.

In the present embodiment, a first embodiment and a second embodiment can be exemplified as specific processing of the method and system for evaluating a bending crack.

First Embodiment

The first embodiment is an example of an evaluation method and an evaluation system for evaluating a bending crack at a sheared end face when performing press forming including bending deformation on a basis of shape information of a component shape of a desired press-formed component and shape information of a press die for forming into the desired press-formed component.

In the first embodiment, first, step 1 (the bend outer side strain acquisition unit 53A) executes processing for acquiring a bend outer side strain at or near a sheared end face to be evaluated in an actual component from a shape of the actual component. Additionally, step 2 (the bend radius acquisition unit 53B) executes processing for acquiring a press die bend radius at a portion forming the sheared end face to be evaluated from the shape information of the press die used.

Next, step 3 (the crack index value calculation unit 53C) executes processing for obtaining a crack index value for evaluating a bending crack at the sheared end face of the desired press-formed component from the acquired bend outer side strain and bend radius.

Furthermore, step 4 (the bending deformation limit acquisition unit 53D) executes processing for obtaining a bending deformation limit for each target metal sheet as evaluation reference information.

Then, step 5 (the bending crack evaluation unit 53E) executes processing for evaluating the bending crack by the obtained crack index value. In the present embodiment, step 5 (the bending crack evaluation unit 53E) evaluates forming allowance for the bending crack by using the obtained crack index value.

Here, in step 1 (the bend outer side strain acquisition unit 53A) and step 2 (the bend radius acquisition unit 53B), measurement processing based on the shape information of the actual component and the shape information of the press die may be made by obtaining from measurement of an actual product of the actual component or by acquiring from shape data of the actual component and the press die.

Second Embodiment

In the second embodiment, step 2 (the bend radius acquisition unit 53B) executes processing for acquiring a bend radius to be used when obtaining a crack index value from the shape information of the actual component. In step 2 (the bend radius acquisition unit 53B), measurement processing based on the shape information of the actual component may be made by obtaining from measurement of an actual product of the actual component or by acquiring from the shape data of the actual component. Other configurations are the same as those of the first embodiment, and therefore a description thereof will be omitted.

In other words, in the second embodiment, step 1 (the bend outer side strain acquisition unit 53A) and step 2 (the bend radius acquisition unit 53B) execute the processing for simply acquiring the bend outer side strain and the bend radius from the shape information of the actual component by measurement of the shape of the actual component or the like. Here, compared to the case where the bend radius is obtained from the press die, obtaining the bend radius from the actual component causes an error due to spring back. Therefore, the second embodiment is advantageous in that while accuracy is reduced compared to the first embodiment, the information for evaluation can be easily acquired.
<Bend Radius>

The acquisition position of the bend radius is at or near the sheared end face to be evaluated.

Here, in the present specification, the phrase "near the sheared end face" refers to, for example, a range within 5 mm, preferably 3 mm, from the sheared end face in a direction away from the sheared end face along a sheet surface direction.

When obtaining the bend radius from the press die, it may be obtained by acquiring the shape information of the press die from an external data base or the like or may be obtained by actually measuring a surface shape of the die, as described above.

When obtaining the bend radius from the actual component, the bend radius may be obtained by measuring an outline profile of the actual component. If there is detailed shape data of the actual component, the bend radius may be obtained from the shape data.

<Bend Outer Side Strain>

The acquisition position of the bend outer side strain is at or near the sheared end face to be evaluated. The term "bend outer side" refers to a surface side that becomes convex along with bending.

Step 1 (the bend outer side strain acquisition unit 53A) calculates a bend outer side strain at or near the sheared end face, for example, from a sheet thickness reduction rate at or near the sheared end face and a bend radius at or near the sheared end face.

The sheet thickness reduction rate is a reduction rate from an initial sheet thickness (a sheet thickness before pressing) due to press forming.

As a method for calculating the bend outer side strain, for example, the sheet thickness reduction rate and the bend radius at or near the sheared end face in the actual component are measured, and the bend outer side strain is obtained from a pure bending theory and the sheet thickness reduction rate by equation (1). This method is preferable because it is simple to acquire the bend outer side strain.

$$\varepsilon_{bend\text{-}out} = 2 \times \varepsilon_{thickness} + (t/2)/(R + t) \qquad (1)$$

Here, $\varepsilon_{bend\text{-}out}$: bend outer side strain at or near the sheared end face, $\varepsilon_{thickness}$: sheet thickness strain at or near the sheared end face, which is a value obtained from a sheet thickness reduction rate [%], R: bend radius at or near the sheared end face in the component after forming, and t: sheet thickness of the metal sheet before forming.

In equation (1), the first term on the right side represents a strain due to tension during press forming, and the second term on the right side represents the strain due to bending deformation during press forming.

Here, the acquisition position of the sheet thickness reduction rate is set to within 5 mm along the sheet surface direction from the sheared end face where a bending crack is evaluated, as described above. The sheet surface direction is preferably a direction orthogonal to an edge of the sheared end face or a direction substantially orthogonal thereto. When the sheet thickness reduction rate is measured at a position more than 5 mm away from the sheared end face, it is affected by other press conditions in the press-formed component, so that there is a concern that a measurement accuracy of the evaluation unit may decrease. More preferably, the acquisition position of the sheet thickness reduction rate is within 3 mm in the sheet surface direction from the sheared end face.

The calculation of the bend outer side strain is not limited thereto. For example, there may be used a method of performing a forming test after transferring a lattice to the sheared end face of a metal sheet before processing and then directly measuring the bend outer side strain from distortion of the lattice. Thus, any method may be used as long as the bend outer side strain can be obtained using the shape information and a measured value by experiment.

<Crack Index Value>

The crack index value is data for evaluating a bending crack at the sheared end face in the desired press-formed component. The crack index value is obtained by step 3 (the crack index value calculation unit 53C) from the bend outer side strain and the bend radius acquired as described above.

The index value in the present embodiment comprises parameter values of bend outer side strain and stress gradient at or near the sheared end face to be evaluated. In other words, the index value in the present embodiment is represented by a set of data (bend outer side strain and stress gradient). The stress gradient in the present embodiment is a stress gradient in the sheet thickness direction.

Here, the stress gradient of a crack concern portion (evaluation position) is obtained from a stress-strain relationship of a metal sheet to be used and a strain distribution at or near the sheared end face. The stress gradient of the crack concern portion (evaluation position) is simply calculated from the stress gradient in the sheet thickness direction at or near the sheared end face.

The range for acquiring the stress gradient is preferably a length that is equal to a crack length used as a crack determination criterion. However, any acquisition range may be used as long as the stress gradient at or near the sheared end face can be calculated. The stress gradient is preferably an average gradient in a range in which the stress is acquired.

An example of the method for calculating the stress gradient will be given below.

Here, the stress of the metal sheet is defined as a function of strain by equation (2):

$$\sigma = \sigma(\varepsilon) \qquad (2)$$

In general, the stress-strain relationship of the metal sheet is obtained from a uniaxial tensile test and extrapolated to stress in a large strain range using Swift and Voce equations, but equation (2) may be defined by any known method.

The stress in the bend outer side strain can be obtained by equation (3) in which equation (1) is substituted into equation (2).

$$\sigma_{bend\text{-}out} = \sigma(\varepsilon_{bend\text{-}out}) \qquad (3)$$

Additionally, a strain present inward by a crack length x for crack determination from the bend outer side can be obtained by equation (4) in the same manner as equation (1).

$$\varepsilon_{bend\text{-}in} = 2 \times \varepsilon_{thickness} + ((t/2) - x)/(R + (t - x)) \qquad (4)$$

Here, $\varepsilon_{bend\text{-}in}$: strain present inward by the crack length for crack determination from the bend outer side.

Then, a stress present inward by the crack length for crack determination from the bend outer side is represented by equation (5) from equations (2) and (4).

$$\sigma_{bend\text{-}in} = \sigma(\varepsilon_{bend\text{-}in}) \qquad (5)$$

From the above, a stress gradient $\Delta\sigma$ at or near the sheared end face can be obtained by equation (6).

$$\Delta\sigma = (\sigma_{bend\text{-}out} - \sigma_{bend\text{-}in})/x \qquad (6)$$

<Evaluation of Forming Allowance for Bending Crack by Crack Index Value>

Evaluation of forming allowance for a bending crack can be made by a relationship between the bending deformation limit of the sheared end face obtained in advance by step 4 (the bending deformation limit acquisition unit 53D) and the crack index value obtained by step 3 (the crack index value calculation unit 53C).

(Method for Determining Bending Deformation Limit of Sheared End Face)

The bending deformation limit of the sheared end face is determined from data obtained, for example, by preparing test pieces including a sheared end face and performing two or more kinds of forming tests different in stress gradients occurring during deformation in step 4 (the bending deformation limit acquisition unit 53D).

As test methods, for example, there are two kinds of desirable tests: a V-bending test with large stress gradient near the sheared end face during deformation and a notched tension test with small stress gradient near the sheared end face during deformation. However, any test method may be used as long as deformations with different stress gradients can be applied to test pieces including a sheared end face produced under the same conditions and the test can be reproduced by FEM analysis.

Before starting the tests, a crack determination criterion in each forming test is determined.

Examples of the method for determining the crack determination reference include various determination methods, such as a method of specifying a crack length for crack determination, a method of specifying as the ratio of crack length to sheet thickness, and a method of determining a crack by crack penetration in a sheet thickness direction, but any determination criterion may be used.

After performing various forming tests, forming conditions (bending deformation limit) at a crack limit of the sheared end face are determined by acquiring a relationship between a crack length at the time of occurrence of cracking and the forming conditions.

In this way, the relationship between the bending deformation limit strain in each forming test and the stress gradient near the crack concern portion is experimentally obtained. In this case, a linear approximation relational expression represented by equation (7) is obtained from the two or more kinds of test results, and the relational expression (equation (7)) is used as a bending deformation limit line of the sheared end face.

$$\varepsilon_{lim} = A \cdot \Delta\sigma + B, B \geq 0 \qquad (7)$$

Here, A and B represent material constants.

Note that the bending deformation limit line represented by the relational expression of equation (7) is an expression of the relationship between the bending strain and the stress gradient.

(Evaluation of Bending Crack at Sheared End Face During Press Forming (Risk Determination))

In the desired press-formed component, a bend outer side strain $\varepsilon_{edge}$ and a stress gradient at a part of concern where a bending crack may occur on the sheared end face of a portion where cracking risk is desired to be evaluated are acquired as a crack index value.

Then, forming allowance for the bending crack is evaluated by comparing the strain $\varepsilon_{edge}$ as the crack index value and a bending deformation limit strain $\varepsilon_{lim}$ in the stress gradient at the sheared end face portion where cracking risk is desired to be determined.

An example of evaluation in step 5 (the bending crack evaluation unit 53E) is determination of cracking risk. For example, step 5 (the bending crack evaluation unit 53E) executes processing for determining that there is a risk of cracking when a condition of equation (8) is satisfied.

$$\varepsilon_{edge} \geq S \times \varepsilon_{lim} \quad (8)$$

Here, S represents a safety factor in consideration of characteristics of the metal sheet to be used, variations in press forming conditions, and the like. When the safety factor is not considered, S is set to 1. When the safety factor is considered, S is set to, for example, 0.5. This is because, in a high strength steel sheet having a tensile strength of 950 MPa or more, the crack length of hair cracking (a minute crack) that occurs from a surface of the bend outer side during bending deformation of the sheared end face tends to begin to grow at a stage where a strain of 50% of the bending crack limit strain of the sheared end face is applied. The lower the tensile strength of the metal sheet, the better S should be close to 1.

Additionally, for example, "$S \times \varepsilon_{lim} - \varepsilon_{edge}$" may be defined as forming allowance D, and in step 5 (the bending crack evaluation unit 53E), the forming allowance state may be evaluated by the forming allowance D.

As described above, according to the present embodiment, for example, it is possible to evaluate the forming allowance at the sheared end face when the selected metal sheet is press-formed into a desired press-formed component. This allows for evaluation with high accuracy on whether the selection of the metal sheet is appropriate, for example, when press forming into a previously determined component, such as a panel component or a structural/skeletal component for an automobile.

For example, when applying press forming including bending deformation to a sheared metal sheet to manufacture a press-formed component in the press manufacturing step 51, the metal sheet to be press-formed is evaluated in advance in the bending crack evaluation step 50 to select a metal sheet that is estimated to have an allowance for bending cracks on the sheared end face, i.e., that is estimated not to cause any bending cracks when the press forming is applied. Then, in the press manufacturing step 51, a press-formed component is manufactured using the selected metal sheet.

This allows for a stable press forming and a significant contribution to reducing a defective rate of the press-formed component.

Example

Next, an Example based on the present invention will be described.

Here, an Example using three kinds of test materials A, B, and C to be selected as a sheared metal sheet will be described.

Table 1 depicts material characteristics of each test material. Here, a Swift equation used in Table 1 is "$\sigma = K(a0+\varepsilon)^n$",

TABLE 1

| Test material | Yield stress YS [Mpa] | Tensile strength TS [Mpa] | Elongation El [%] | Sheet thickness [mm] | Swift equation parameters | | |
|---|---|---|---|---|---|---|---|
| | | | | | K [MPa] | a0 | n |
| A | 924 | 1285 | 11.5 | 1.4 | 1668 | 0.006 | 0.070 |
| B | 985 | 1194 | 16.6 | 1.2 | 1768 | 0.007 | 0.126 |
| C | 1183 | 1353 | 8.1 | 1.6 | 1672 | 0.008 | 0.052 |

Figure 4:
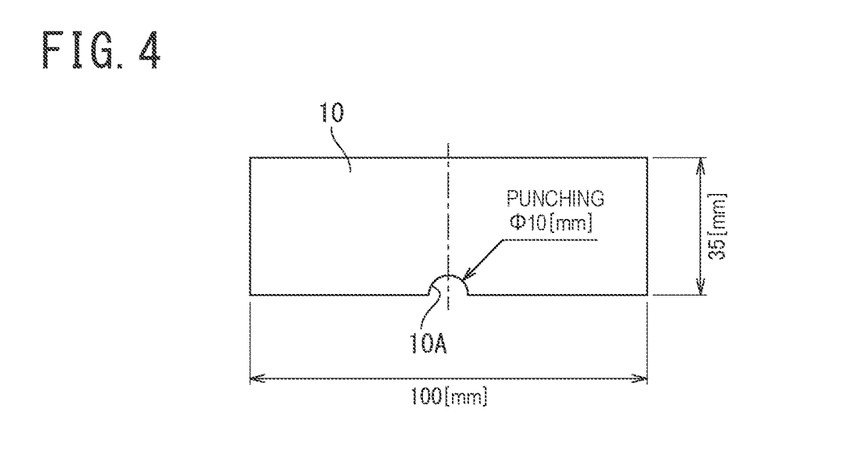
FIG. 4 is a diagram illustrating a test piece shape used in an Example.
Figure 5:
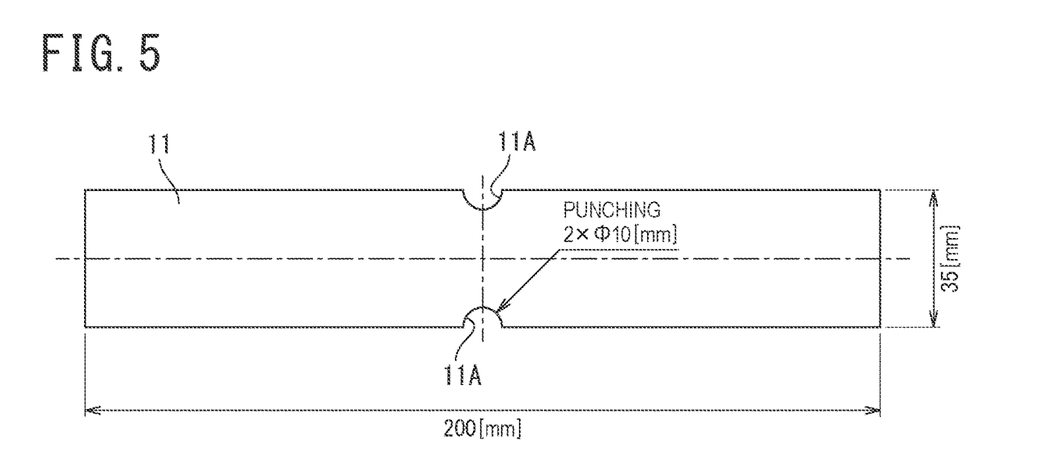
FIG. 5 is a diagram illustrating a test piece shape used in the Example.

A punched hole was formed in each test material, and each test material was cut into a predetermined test piece shape (see FIGS. 4 and 5).

A punching clearance is preferably from 5% to 20% of the sheet thickness. When it is less than 5%, a secondary sheared surface is generated. On the other hand, when it is more than 20%, noticeable burrs are produced and become starting points of crack generation, which destabilizes and reduces formability of the end face. Thus, if the punching clearance is outside the range of from 5% to 20% of the sheet thickness, it is not preferable as a clearance in mass production of the component. More preferably, the clearance is set to a narrower range of from 10% to 15% because the formability thereof is stable.

FIG. 4 illustrates a test piece shape for the V-bending test. FIG. 5 illustrates a test piece shape for the notched tension test.

Figure 6:
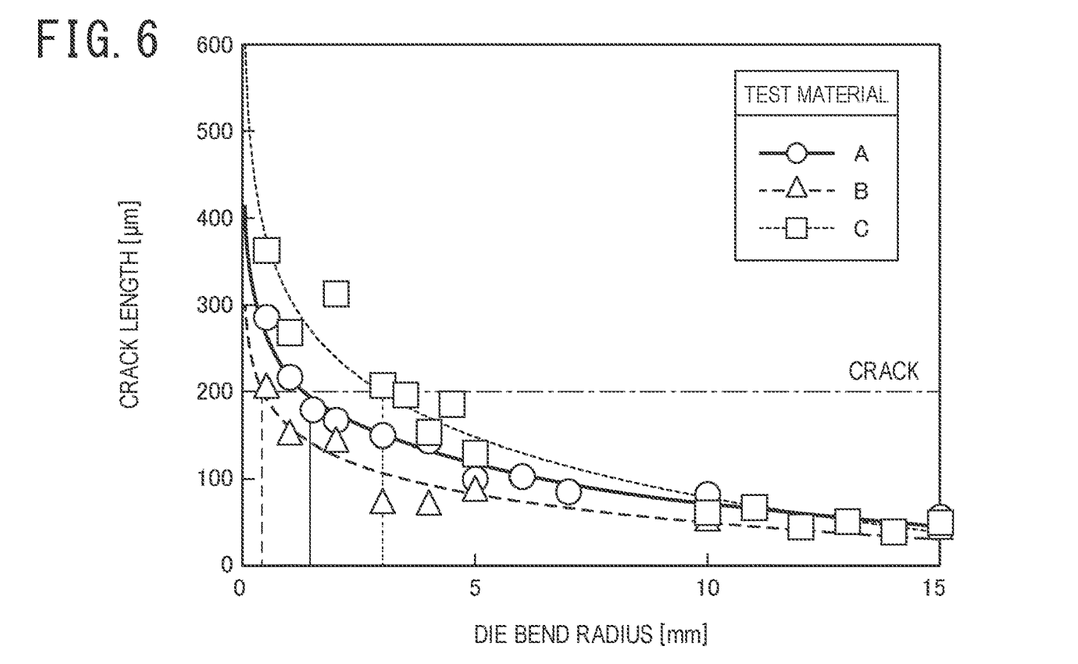
FIG. 6 is a diagram illustrating a relationship between crack length and bend radius acquired by a V-bending test.

Then, the V-bending test was performed on the test piece 10 of FIG. 4 by varying the bend radius to acquire a relationship between the crack length of the sheared end face 10A and the forming condition (die bend radius) as illustrated in FIG. 6.

Figure 7:
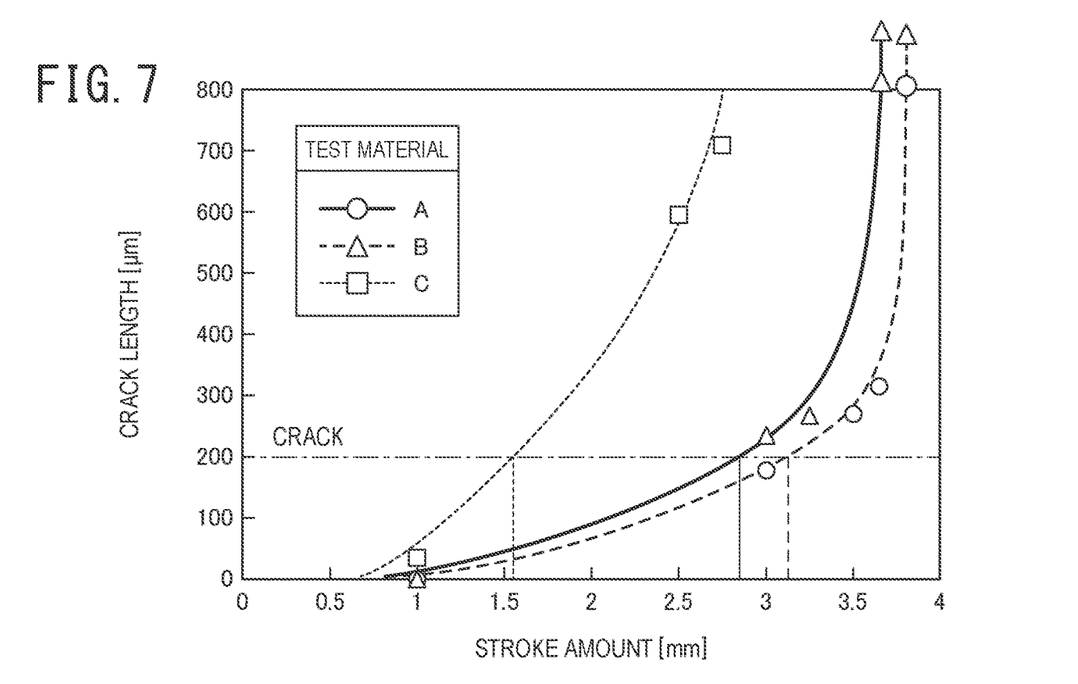
FIG. 7 is a diagram illustrating a relationship between crack length and stroke amount acquired by a notched tension test.

Additionally, the notched tension test was performed on the test piece 11 of FIG. 5 by varying the amount of tensile strokes to acquire a relationship between the crack length at the sheared end face 11A and the forming condition (the amount of strokes) as illustrated in FIG. 7.

In the present Example, test results with crack lengths of 200 μm or more were determined to be cracks.

However, as described above, the criterion for determination of a bending crack can be arbitrarily determined, and there are no restrictions due to crack length. The crack length may be 100% of the sheet thickness or 50% thereof. Note that, to reduce the defective rate of a target press component, it is better to determine as a crack when the crack length is shorter. In that case, the criterion for determination of a bending crack is preferably 50% or less of the sheet thickness, and more preferably 30% or less of the sheet thickness.

Here, as described above, by defining that those with crack lengths of 200 μm or more are determined as cracks, forming conditions for crack determination in each test were determined.

Table 2 depicts calculation results of the bend radius at the sheared end face, the sheet thickness reduction rate, the bend outer side strain calculated using equation (1), and the stress gradient calculated by equations (1) to (6) in each forming condition.

TABLE 2

| Test material | V-bending test | | | | Notched tension test | | | |
|---|---|---|---|---|---|---|---|---|
| | Bend radius at sheared end face [mm] | Sheet thickness reduction rate [%] | Bend outer side strain equation (1) | Stress gradient [MPa · mm$^{-1}$] | Bend radius at sheared end face [mm] | sheet thickness reduction rate [%] | Bend outer side strain equation (1) | Stress gradient [MPa · mm$^{-1}$] |
| A | 0.57 | 9 | 0.53 | 78 | 1582 | 11 | 0.22 | 0 |
| B | 0.43 | 10 | 0.57 | 174 | 2017 | 11 | 0.22 | 0 |
| C | 1.01 | 10 | 0.51 | 61 | 743 | 1 | 0.02 | 3 |

Here, the bend radius, which is the forming condition, was obtained by microscopically observing the sheared end face of the sample after forming. The reason for that is as follows. Specifically, in the V-bending test close to pure bending deformation, a ridgeline warpage occurs at the sheared end face, and the sheared end face is bent with a bend radius different from the bend radius of the press die. On the other hand, in the notched tension test, the occurrence of a constriction causes geometrically very small bending forming to be added to the sheared end face. Thus, the form of bending formed by each test is different.

Note that, in the present Example, a bend radius in the notch tension is also taken into consideration in the calculation. However, practically, the bend outer side strain of a bending component generated by small bending deformation that occurs in the notch tension can be ignored.

Figure 8:
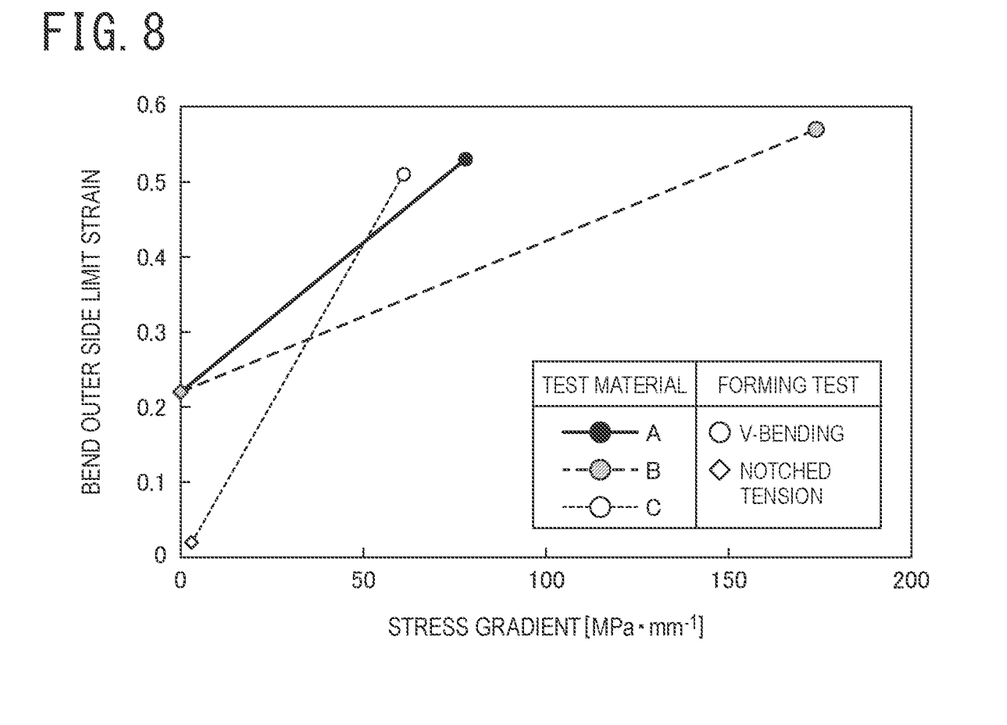
FIG. 8 is a diagram illustrating a relationship between bending limit strain and combined stress gradient.

From these results, a relationship between the bend outer side strain at the bending deformation limit and the stress gradient as illustrated in FIG. 8 was obtained for each test material. In other words, for each test material, the relationship between the bend outer side strain at the bending deformation limit and the stress gradient was individually obtained.

This result shows that the forming allowance for the sheared end face can be evaluated by experimentally obtaining the bend outer side strain and the stress gradient, which represent the crack index value of the desired press-formed component. For example, the risk of a bending crack at the sheared end face when metal sheets made of each test material are used can be determined for each.

Figure 9:
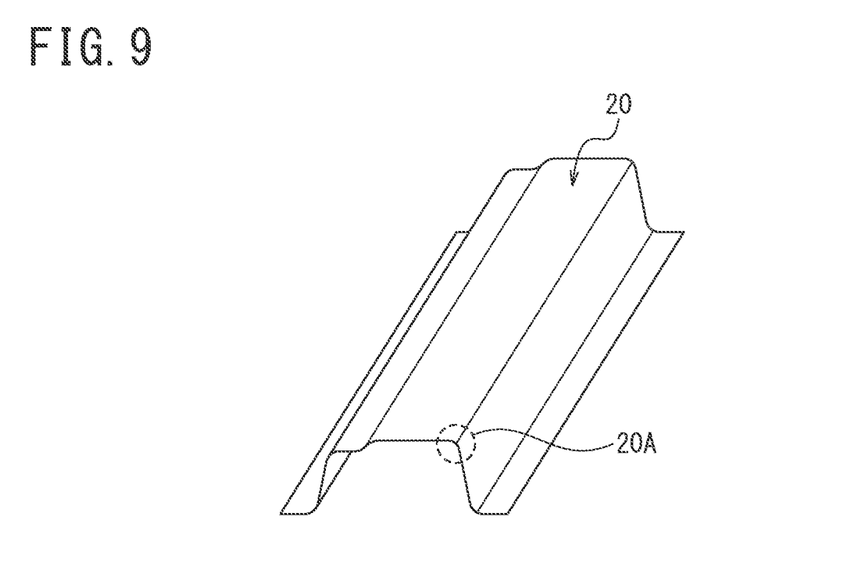
FIG. 9 is a diagram illustrating an example of an evaluation position of a shear bending crack in a desired actual component (press-formed component) in the Example.

As an example, an evaluation position 20A is given in a press-formed component 20 having a shape illustrated in FIG. 9.

The test materials A to C were used as the materials of metal sheets to be press-formed. Additionally, bending cracks were evaluated at one place where forming was the most difficult (see FIG. 9).

Figure 10:
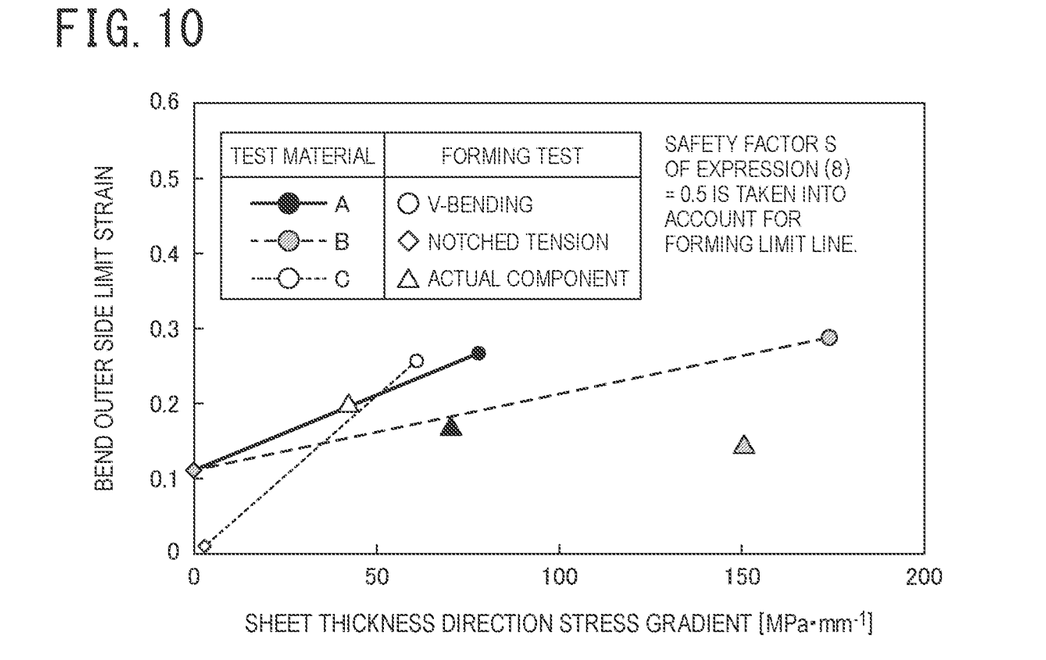
FIG. 10 is a diagram illustrating evaluation results of forming limits in consideration of a safety factor in the actual component.

Table 3 and FIG. 10 illustrate measurement results in the evaluation.

TABLE 3

| Test material | Bend radius at sheared end face [mm] | Sheet thickness reduction rate [%] | Bend outer side strain equation (1) | Stress gradient [MPa · mm$^{-1}$] | Allowance determination |
|---|---|---|---|---|---|
| A | 7.0 | 4 | 0.16 | 72 | ○ |
| B | 7.0 | 3 | 0.13 | 154 | ○ |
| C | 7.0 | 5 | 0.19 | 45 | X |

It should be noted that, in FIG. 10, the safety factor S of equation (8) for considering the forming allowance was set to 0.5 in the present evaluation.

The present evaluation has showed that the test material C has been able to be formed at this stage, but considering the allowance, there is a concern that the sheared end face may bend and crack due to changes in pressing conditions or the like.

Thus, it can be seen that the forming allowance for a bending crack can be evaluated for each condition of the metal sheet used.

Here, the present invention is not limited to the contents described above. For example, the above Example has illustrated an example in which the present invention has been applied to a steel sheet having a tensile strength of 980 MPa class or more (a steel sheet of 1180 MPa class). Preferably, the present invention is applied to press forming of such a high strength steel sheet, but it can also be applied to steel sheets having a tensile strength of less than 980 MPa class and to metal sheets other than steel sheets.

The entire contents of Japanese Patent Application No. 2019-033076 (filed on Feb. 26, 2019) to which the present application claims priority form a part of the present disclosure by reference. Although the present invention has been described with reference to a limited number of embodiments, the scope of rights of the present invention is not intended to be limited thereto, and modifications of each embodiment based on the above disclosure will be obvious to those skilled in the art.

REFERENCE SIGNS LIST

20: Press-formed component
20A: Evaluation position
50: Bending crack evaluation step
51: Press manufacturing step
53: Bending crack evaluation system
53A: Bend outer side strain acquisition unit
53B: Bend radius acquisition unit
53C: Crack index value calculation unit
53D: Bending deformation limit acquisition unit
53E: Bending crack evaluation unit

The invention claimed is:

1. A bending crack evaluation method for, when applying press forming including bending deformation to a metal sheet subjected to shearing to manufacture a desired press-formed component, evaluating a bending crack at a sheared end face being an end face subjected to the shearing, the method comprising obtaining a crack index value for evaluating the bending crack at the sheared end face of the press-formed component from a bend outer side strain at or near the sheared end face acquired on a basis of a component shape of the press-formed component and a press die bend radius at a portion forming the sheared end face in a press die used in the press forming.

2. The bending crack evaluation method according to claim 1, wherein the bend outer side strain is calculated from a sheet thickness reduction rate at or near the sheared end face acquired on the basis of the component shape of the press-formed component, and the bend radius.

3. The bending crack evaluation method according to claim 2, wherein an acquisition position of the sheet thickness reduction rate is set to within 5 mm along a sheet surface from the sheared end face.

4. The bending crack evaluation method according to claim 3, wherein forming allowance for the bending crack is evaluated by the crack index value.

5. The bending crack evaluation method according to claim 2, wherein the crack index value is represented by a stress gradient in a sheet thickness direction at or near the sheared end face obtained from the bend outer side strain and the bend radius by using a stress-strain relationship of the metal sheet, and the bend outer side strain.

6. The bending crack evaluation method according to claim 2, wherein forming allowance for the bending crack is evaluated by the crack index value.

7. The bending crack evaluation method according to claim 1, wherein the crack index value is represented by a stress gradient in a sheet thickness direction at or near the sheared end face obtained from the bend outer side strain and the bend radius by using a stress-strain relationship of the metal sheet, and the bend outer side strain.

8. The bending crack evaluation method according to claim 7, wherein forming allowance for the bending crack is evaluated by the crack index value.

9. The bending crack evaluation method according to claim 1, wherein forming allowance for the bending crack is evaluated by the crack index value.

10. A method for manufacturing a press-formed component, configured to apply press forming including bending deformation to a metal sheet subjected to shearing to manufacture the press-formed component, the method comprising evaluating a metal sheet to be press-formed by the bending crack evaluation method according to claim 1 to select a metal sheet estimated that no bending cracks occur at the sheared end face when the press forming is applied and using the selected metal sheet to manufacture the press-formed component.

11. A bending crack evaluation method for, when applying press forming including bending deformation to a metal sheet subjected to shearing to manufacture a desired press-formed component, evaluating a bending crack at a sheared surface being an end face subjected to the shearing, the method comprising acquiring a bend outer side strain and a bend radius at or near the sheared end face on a basis of a component shape of the press-formed component and obtaining a crack index value for evaluating the bending crack at the sheared end face of the press-formed component from the acquired bend outer side strain and bend radius.

12. A method for manufacturing a press-formed component, configured to apply press forming including bending deformation to a metal sheet subjected to shearing to manufacture the press-formed component, the method comprising evaluating a metal sheet to be press-formed by the bending crack evaluation method according to claim 11 to select a metal sheet estimated that no bending cracks occur at the sheared end face when the press forming is applied and using the selected metal sheet to manufacture the press-formed component.

13. The bending crack evaluation method according to claim 12, wherein the crack index value is represented by a stress gradient in a sheet thickness direction at or near the sheared end face obtained from the bend outer side strain and the bend radius by using a stress-strain relationship of the metal sheet, and the bend outer side strain.

14. The bending crack evaluation method according to claim 11, wherein the bend outer side strain is calculated from a sheet thickness reduction rate at or near the sheared end face acquired on the basis of the component shape of the press-formed component, and the bend radius.

15. The bending crack evaluation method according to claim 11, wherein the crack index value is represented by a stress gradient in a sheet thickness direction at or near the sheared end face obtained from the bend outer side strain and the bend radius by using a stress-strain relationship of the metal sheet, and the bend outer side strain.

16. The bending crack evaluation method according to claim 11, wherein forming allowance for the bending crack is evaluated by the crack index value.

17. A bending crack evaluation method for, when applying press forming including bending deformation to a metal sheet subjected to shearing to manufacture a desired press-formed component, evaluating a bending crack at a sheared end face being an end face subjected to the shearing, wherein the bending crack at the sheared end face of the press-formed component is evaluated from a stress gradient in a sheet thickness direction and a bend outer side strain at or near the sheared end face to be evaluated, the stress gradient and the bend outer side strain being acquired on a basis of shape information of the press-formed component.

18. A method for manufacturing a press-formed component, configured to apply press forming including bending deformation to a metal sheet subjected to shearing to manufacture the press-formed component, the method comprising evaluating a metal sheet to be press-formed by the bending crack evaluation method according to claim 17 to select a metal sheet estimated that no bending cracks occur at the sheared end face when the press forming is applied and using the selected metal sheet to manufacture the press-formed component.

19. A bending crack evaluation system for, when applying press forming including bending deformation to a metal sheet subjected to shearing to manufacture a desired press-formed component, evaluating a bending crack at a sheared end face being an end face subjected to the shearing, the system comprising a crack index value calculation unit configured to input a bend outer side strain at or near the sheared end face acquired on a basis of a component shape of the press-formed component and a press die bend radius at a portion forming the sheared end face in a press die used in the press forming and obtain a crack index value for evaluating the bending crack at the sheared end face of the press-formed component from the input bend outer side strain and bend radius.

20. A bending crack evaluation system for, when applying press forming including bending deformation to a metal sheet subjected to shearing to manufacture a desired press-formed component, evaluating a bending crack at a sheared end face being an end face subjected to the shearing, the system comprising a crack index value calculation unit configured to input a bend outer side strain and a bend radius at or near the sheared end face acquired on a basis of a component shape of the press-formed component and obtain a crack index value for evaluating the bending crack at the sheared end face of the press-formed component from the input bend outer side strain and bend radius.

\* \* \* \* \*